Aug. 26, 1958 N. H. DIETER, JR., ET AL 2,849,239

PHONOGRAPH PICKUPS

Filed Feb. 7, 1955

INVENTORS
N. H. DIETER JR.
I. MICHALKO

BY Greene, Pineles & Durr

ATTORNEYS 2,849,239

PHONOGRAPH PICKUPS

Norman H. Dieter, Jr., Pleasantville, and Ignatius Michalko, Ossining, N. Y., assignors to Sonotone Corporation, Elmsford, N. Y., a corporation of New York Application February 7, 1955, Serial No. 487,508

6 Claims. (Cl. 274—37)

This invention relates to phonograph pickups and more particularly to phonograph pickups which are utilized for transducing laterial undulations of a record groove into corresponding electric signals although the broad features of the invention are applicable to phonograph pickups used with other types of record grooves.

As disclosed in Burt Patent 2,328,952, phonograph pickups having a stylus drive arm arranged for detachable positioning on and coupling to the mechano-electric signal transducer of the pickup have been long known to the art.

Among the objects of the invention is a phonograph pickup of the foregoing type which is simple in construction and permits ready positioning and removal of the stylus drive arm from its mounting structure of the pickup while providing for high fidelity playback of recorded sound.

The foregoing and other objects of the invention will be best understood from the foregoing description of exemplifications of the invention, reference being had to the accompanying drawings wherein.

Figures 1, 2, 3, 4, 5, 5A, 6, 7:
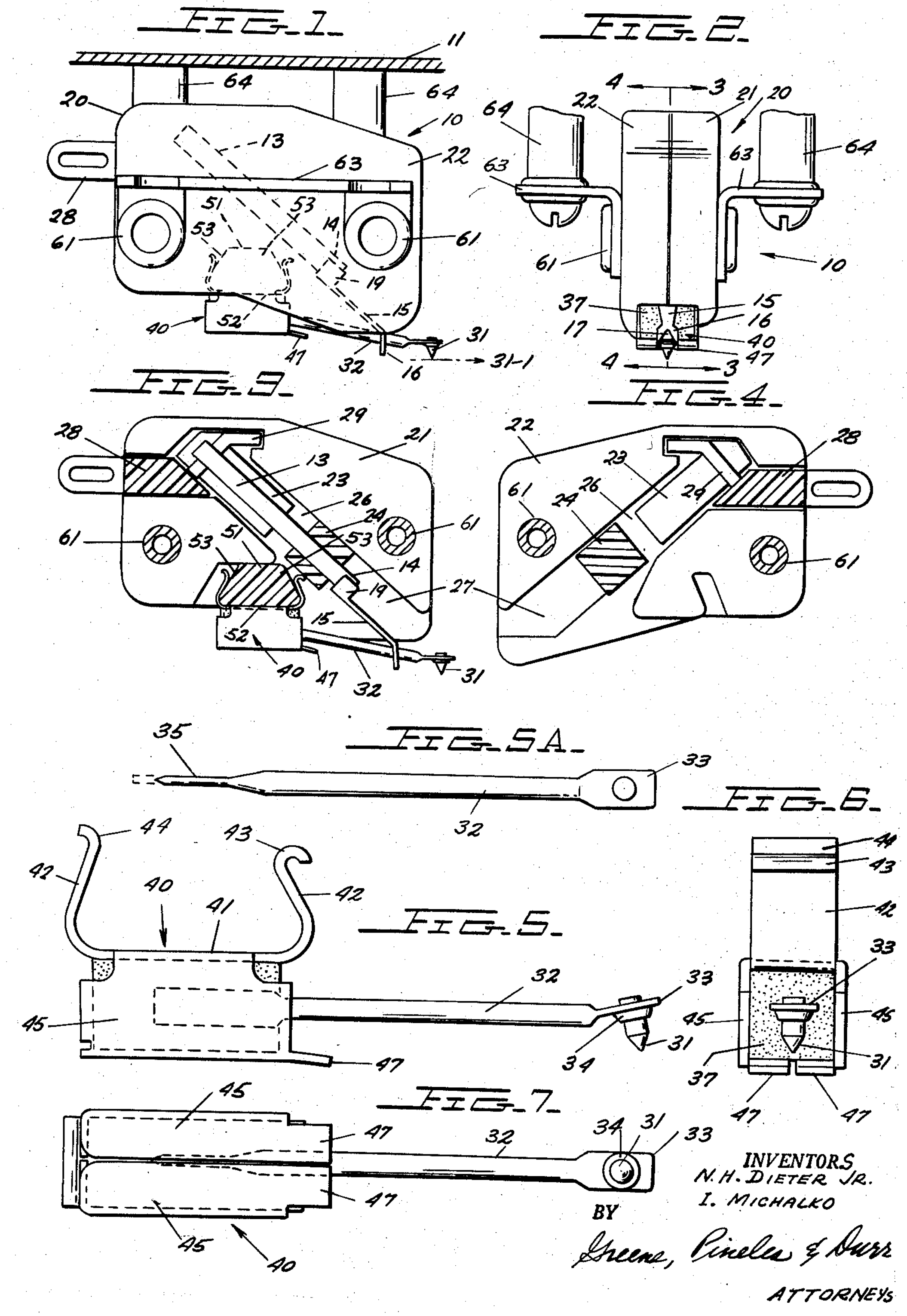
Fig. 1 is a side elevational view of one form of a pickup of the invention, held mounted in the tone arm of a phonograph.
Fig. 2 is a front view of the pickup of Fig. 1.
Fig. 3 is a cross-sectional view along lines 3—3 of Fig. 2.
Fig. 4 is a cross-sectional view along lines 4—4 of Fig. 2.
Fig. 5 is a side view of the detachable stylus drive rod unit.

Fig. 5–A is a top view of the stylus drive rod without its positioning structure;

Figs. 6 and 7 are end and top views, respectively, of the detachable stylus drive rod unit of Fig. 5.

One form of a pickup of the invention is shown in the drawings. Figs. 1 and 2 show the pickup 10 in its operative position secured to the downwardly facing side of the front end of a tone arm 11, with the stylus 31 of the pickup held in engagement with a laterally undulating groove of a conventional record member such as a record disc not shown. Fig. 1 is intended to show the stylus 31 engaging a groove portion of a record groove, for instance, of a circular record disc, moving in a forward record playing direction indicated by arrow line 31–1. The stylus 31 is carried at the forward end of a stylus drive rod 32 extending substantially in a vertical plane through the forward playing direction 31–1 of the record groove and in generally the same direction. The pickup 10 comprises a mechano-electric transducer structure generally designated 13, a portion of which is held in a mounting structure or casing 20. The transducer structure 13 has a movable forward portion 14 provided with a tongue-like coupling member 15 having at its front coupling end 16 a perforation or recess 17 shaped to detachably hold in coupling driving engagement the forward end of the stylus drive rod 32 in the manner indicated in Figs. 1, 2, 3.

Any of the known mechano-electric transducer structures of the type suitable for use in phonograph pickups may form part of the phonograph pickup 10. The particular pickup shown has a mechano-electric transducer 13 formed of a flat generally elongated strip-shaped piezo-electric structure having at least two electrodes and designed so that when bent or strained transversely to its length it will generate corresponding signal voltages which are impressed by its electrodes on the playback circuit. The specific pickup shown operates with a piezo-electric ceramic titanate transducer 13 consisting principally of barium titanate and having an overall thickness of 0.020 to 0.030 inch, a total length of about 0.550 inch and a width of about 0.070 inch. The lever-like piezo-electric transducer 13 is retained in its operative position within the casing 20 by two sets of elastomer pads 23, 24 of suitable elastomer substance and arranged to exert on the piezo-electric elements of the transducer 13 compliant reaction forces resisting their displacement so as to cause them to generate electric signal voltages corresponding to the undular strains or motions imparted to its forward drive end 14. The elastomer pads 23 and 24 are held in their proper operative position by the casing or housing structure 20 shown consisting of two complementary housing walls 21, 22 which are suitably secured to each other, as by two rivets 61. The interior faces of the two housing walls 22 are provided with elongated recesses defining a compartment 26 of somewhat greater width than the transducer structure 13 for holding therein the elastomer pads 23, 24 in their proper operative position relatively to the elongated piezoelectric transducer strip 13. The transducer compartment 26 is open at its front end 27 in which the drive end portion 14 of the transducer structure 13 is positioned. In the particular pickup shown, the rivets 61 also hold fastened to the casing walls 21, 22 mounting brackets 63 with which the pickup 10 is held secured, as by screws, to mounting bosses 64 of the tone arm 11. However, the narrow pickup casing 20 may be held wedged in its proper position within a suitable narrow compartment space of the tone arm, as by elastomer pads held wedged between the outer faces of the housing and the facing walls of the tone-arm compartment.

The inner end of each terminal member 28 is provided with a spring-like flexible tail portion 29 folded in the way indicated in Figs. 3 and 4, over the adjacent portion of the associated elastomer pad 23 and held pressed thereby into contact engagement with the facing adjacent electrode surface of the piezoelectric transducer structure 13 held between them. There are thus provided external terminal connections 28 from the outer electrode surfaces of the piezoelectric transducer structure 13 for supplying the signal output thereof to the playback circuit.

The stylus coupling member 15 of the transducer structure 13 is formed of relatively stiff sheet metal. In the form shown, its rear end has two junction ears 19 bent into a U-shaped mounting socket in which is insulatingly affixed, as by suitable insulating cement, the forward drive portion 14 of the piezoelectric transducer element 13 so as to form a fixed coupling portion thereof through which it is coupled to the stylus drive rod 32. The relatively long coupling extension 15 of the piezoelectric transducer 13 is designed to be relatively stiff for motion transmitted by lateral movement of the stylus drive rod 32, but it has relatively high flexibility in the direction of a vertical plane through its longitudinal axis so as to prevent transmission of any vertical motion of the stylus drive rod 32 to the piezoelectric transducer 13. If a pickup of the type shown is intended for use with a vertically undulating record groove the coupling extension 15 will be given the greater flexibility in lateral direction and relatively great stiffness in vertical direction.

In accordance with the invention, the elongated flexible stylus drive rod member 32 is combined with a coaxial elastomer body in which its rear portion 35 is embedded and carried, the coaxial elastomer body being apart of a relatively stiff positioning structure 40 having two positioning arms 42 by which it is detachably joined to mechanically firm elements of the transducer structure 13 or its mounting structure 20.

There will be now described in connection with Figs. 1 to 4, and the more specific detailed Figs. 5–7, one specific form of a detachable stylus drive unit exemplifying the principle of the invention. The flexible stylus drive arm or rod 32 is formed out of an elongated extremely thin and light rod member carrying at its front end a stylus 31, which may be a diamond, sapphire or the like. The stylus drive rod 32 is shown as having a flattened front end 33 which is provided with a minute socket 34 holding anchored therein the stylus 31. A relatively long rear end portion 35 of the stylus 32 is held embedded in the interior of an elongated coaxial elastomer body 37 of suitable highly compliant elastomer material. The coaxial elongated elastomer body 37 has a volume of a much higher order of magnitude than the volume of the drive rod portion 35 held embedded therein. This relatively large elastomer body 37 is carried in its operative position by a relatively firm stylus positioning structure 40 having two spaced junction arms 42 through which it is joined in a positive way to firm mechanical body portions of the transducer mounting structure 20. The stylus positioning structure 40 is shown formed of a single sheet member having intermediate sheet portion 41 provided with a pair of enclosure arms 45 extending from opposite sides thereof in a direction transverse to the longitudinal direction of the elastomer body 37 and bent or shaped to form a firm enclosure embracing and holding therein in proper operative position the elastomer body 37 carrying embedded therein the rear portion 35 of the stylus drive rod 32. The two opposite junction arms 42 of the positioning structure 40 extend from its intermediate sheet portion 41 in a direction transverse to the two elastomer enclosure arms 45 thereof.

The stylus positioning structure 40 with its two spaced junction arms 42 is designed and shaped to assure that its two junction arms 42 with their inwardly bent end portions 43, 44 may be readily brought into clamping engagement with the aligning surfaces of the firm aligning member 51 of the transducer mounting structure 20. The aligning member 51 is designed and shaped to bring and hold the stylus positioning structure 40 in the properly aligned operative position on the transducer housing 20 in which the stylus drive rod 32 will be held properly coupled to the transducer 13 for securing playback of records with high fidelity. In the form of pickup shown, the firm aligning member 51 is formed by an inward solid body projection of casing wall member 21 of the transducer casing 20 (Figs. 1, 3). This solid aligning member 51 has an outward aligning surface 52 the two opposite edge regions of which merge in or are adjoined by two spaced inwardly tapering aligning surfaces 53 shaped for aligning and clamping engagement with the intermediate sheet portion 41 and the two junction arms 42 of the stylus positioning structure 40.

The positioning structure 40 is formed of elastically deformable sheet material such as, elastic sheet metal, and the inwardly bent end portions 43, 44 (Fig. 5) of its two spaced junction arms 42 are set to be returned by their elastic restoring forces to a closer-spacing released position when they are removed from engagement with the aligning member 51 of the mounting structure 20. As a result, their elastic restoring forces will hold the two junction arms 42 in clamping engagement with the tapered aligning surfaces 53 of the aligning member 51, and thereby hold the positioning member 40 affixed in its aligned operative position on the transducer housing 20 in which the stylus rod 32 is held in its properly coupled position in relation to transducer 13. The end portions 43, 44 of the two inwardly bent junction arms 42 are outwardly rounded so that when the stylus positioning structure 40 is brought against the aligning member 51 of the transducer mounting structure 20, the two rounded end portions 43, 44 of the junction arms 42 will ride over the facing rounded edges of the aligning member 40 and thereafter snap inwardly by the action of their biasing forces until they reach their inward aligned position shown in Fig. 3, wherein the stylus drive rod 32 is maintained in the proper coupling position relatively to the transducer mounting structure 20. After so joining the positioning member 40 of the stylus drive rod 32 to the transducer mounting structure 20—the forward part of the stylus drive rod 32 may be readily brought into engagement with the seating recess 17 of the transducer coupling tongue 15 by flexing the elastic stylus drive rod 32 in downward direction (as seen in Figs. 1 and 3) and then releasing it so that its elastic restoring forces return it into the recess 17 of the transducer coupling member 15.

To facilitate removal of the stylus drive rod 32 from its coupled position shown in Figs. 1–3, the stylus positioning structure 40 is provided with a grip extension or tongue 47 which projects therefrom slightly below the portion of the stylus drive rod 32 emerging from the elastomer body 37. To remove the stylus drive rod 32, the grip tongue 47 of its positioning member 40 is gripped, and it is moved outwardly away from the mounting structure 20 (as seen in Figs. 1 and 2) until the adjacent junction arm 42 is elastically forced away and released from the aligning member 50.

In an analogous way the stylus drive rod 32 may be joined with its aligning structure 40 to the transducer mounting structure 20 and its transducer 13 by proceeding, for instance, as follows: The end portion 44 of the rear junction arm 45 of positioning structure 40 is first placed against the rear aligned surface 53 of aligning member 51 of the transducer mounting structure 20. Thereupon the front end of the stylus positioning structure 40 is tilted towards the aligning member 51 of the transducer mounting structure, this tilting movement in inward direction being continued until the forward junction member 42 overlying the grip tongue 47 is forced into engagement with the inwardly tapering underlying aligning surface 52 of the aligning member 51 of the transducer housing 20.

The pickup of the invention of the type described above in connection with a specific exemplification thereof is characterized by various desirable novel features. The thin flexible stylus drive rod with its forward groove-engaging stylus has its rear part embedded in a coaxial elongated elastomer body which is carried by a relatively firm positioning member having two spaced junction arms by which it is detachably held in its aligned operative position on the mounting structure of the mechano-electric transducer. The positioning structure has aligning elements with aligning surfaces arranged to automatically be brought into alignment with cooperating aligning surface portions of the transducer mounting structure when the junction arms of the positioning structure are moved into their operative position on the mounting structure. More specifically, the transducer mounting structure has an aligning member extending transversely to the elongated direction of the stylus drive rod arranged to come into aligning engagement with the corresponding aligning surfaces of the stylus drive rod and assure proper aligned coupling of the stylus drive member to the transducer structure when the stylus drive rod is brought towards its operative position on the transducer mounting structure. More specifically, the transversely extending aligning member of the transducer mounting structure has aligning surface portions extending transversely to the elongated direction of the stylus drive rod arranged to come into aligning engagement with the corresponding aligning surfaces of the stylus drive rod and align it and the stylus drive rod in its proper coupled position along the transducer when the stylus drive rod is moved towards its operative position on the stylus mounting structure.

The features and principles underlying the invention described above in connection with specific exemplifications, will suggest to those skilled in the art many other modifications thereof. It is accordingly desired that the appended claims be construed broadly and that they shall not be limited to the specific details shown and described in connection with exemplifications thereof.

We claim:

1. In a phonograph pickup having a mechano-electric transducer structure and a stylus support for a stylus which drives the transducer structure, a stylus drive structure comprising a thin, elongated drive member carrying at its front portion a single stylus only, an elongated elastomer body coaxial with said drive member and holding flexibly embedded therein a substantial length of the rear portion of said drive member, a relatively thick elongated positioning structure engaging and holding in position longitudinally spaced portions of said elastomer body, said elastomer body constituting the sole connection between said positioning structure and said drive member, said positioning structure having two elastically flexible junction arms with facing junction surfaces extending transversely to the longitudinal axis of said drive member and longitudinally spaced along the length of said drive member, whereby said junction arms are movable into detachable elastic clamping engagement with spaced surfaces of the stylus support of said pickup for thereby fixing the operative coupling position of said stylus drive structure relatively to the transducer structure.

2. In combination with a stylus drive structure as claimed in claim 1, a phonograph pickup comprising a mechano-electric transducer structure and a casing enclosing at least part of said transducer structure, said casing having a positioning member forming part of a wall of said casing and having said two positioning surfaces.

3. In the combination as claimed in claim 1, said casing having at least two complementary wall members, one of said wall members having said positioning member.

4. In combination with a stylus drive structure as claimed in claim 1, a phonograph pickup comprising a mechano-electric transducer structure having a mounting structure having two spaced positioning surfaces arranged to be engaged by said two junction arms when said positioning structure holds said stylus drive structure in operatively coupled position with said transducer structure, said positioning structure comprising a sheet member having two arms embracing a substantial length of said elongated elastomer body and two other arms constituting said two junction arms.

5. In the combination as claimed in claim 1, said mounting structure being formed by a casing enclosing at least part of said transducer structure, said mounting structure having a positioning member forming part of a wall of said casing and having said two positioning surfaces.

6. In the combination as claimed in claim 1, said casing having at least two complementary wall members, one of said wall members having said positioning member.

References Cited in the file of this patent

UNITED STATES PATENTS

| | | |
|---|---|---|
| 642,236 | Larimer | Jan. 30, 1900 |
| 2,567,105 | Dreisbach | Sept. 4, 1951 |
| 2,575,999 | Cordes | Nov. 20, 1951 |
| 2,578,381 | Tinnerman | Dec. 11, 1951 |
| 2,702,317 | Palo et al. | Feb. 15, 1955 |
| 2,717,929 | Klingener | Sept. 13, 1955 |

FOREIGN PATENTS

| | | |
|---|---|---|
| 109,632 | Australia | Jan. 19, 1940 |